May 19, 1936.      F. R. HIGHT      2,041,656
METHOD OF MAKING WHEELS
Filed June 7, 1932      2 Sheets-Sheet 1
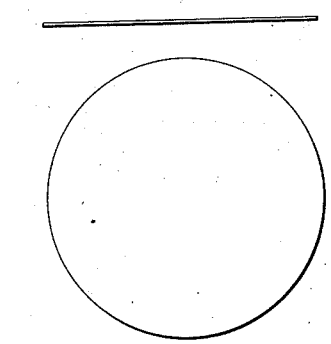
Fig.1
Fig.2
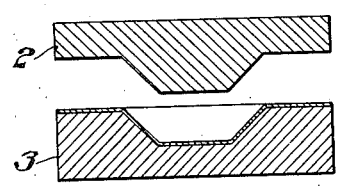
Fig.3
Fig.4
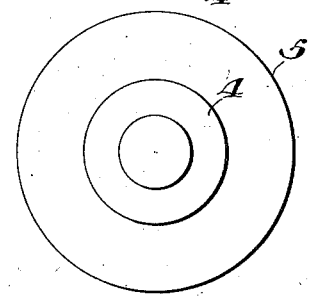
Fig.5
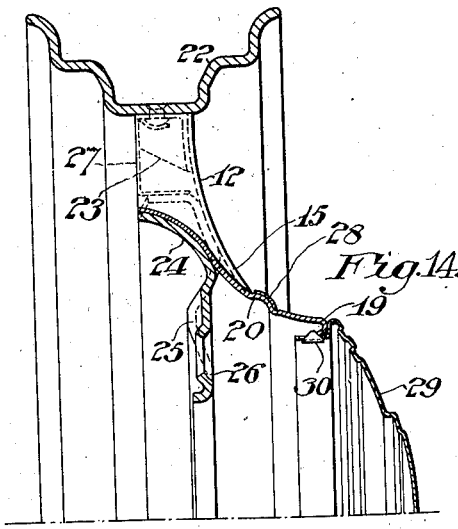
Fig.14
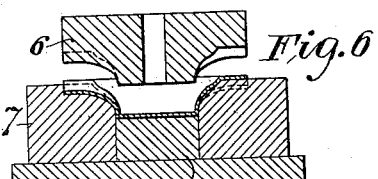
Fig.6
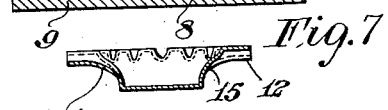
Fig.7
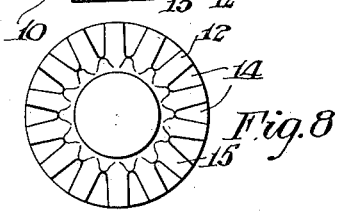
Fig.8
Fig.9
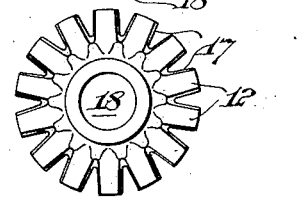
Fig.10
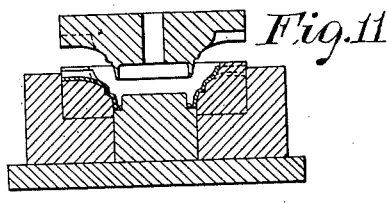
Fig.11
Fig.12
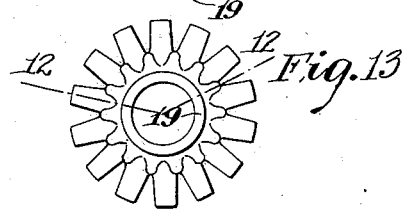
Fig.13
INVENTOR
Franklin R. Hight,
BY John P. Tailor
ATTORNEY May 19, 1936.　　　　F. R. HIGHT　　　　2,041,656
METHOD OF MAKING WHEELS
Filed June 7, 1932　　　　2 Sheets-Sheet 2
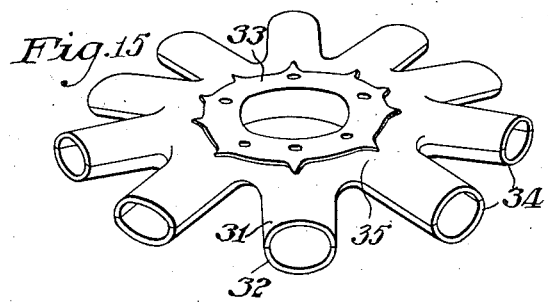
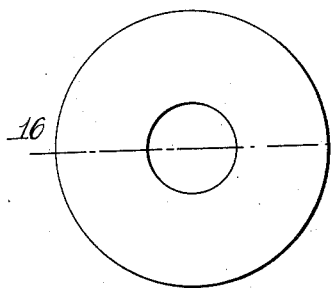
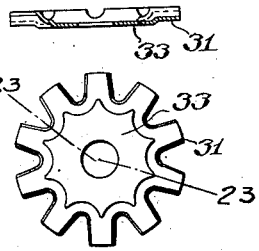
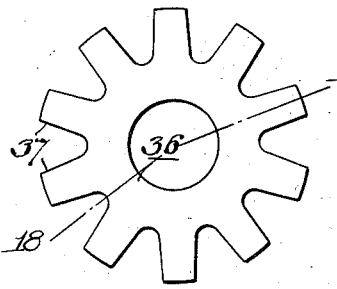
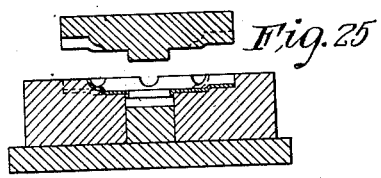
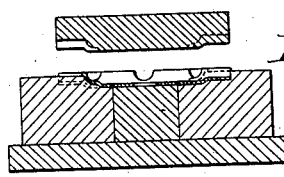
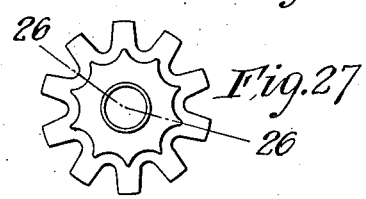
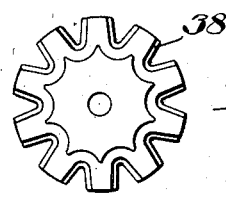
INVENTOR
Franklin R. Hight,
BY
John P. Tarbox
ATTORNEY Patented May 19, 1936

2,041,656

UNITED STATES PATENT OFFICE 2,041,656

METHOD OF MAKING WHEELS

Franklin R. Hight, Detroit, Mich., assignor to Budd Wheel Company, Philadelphia, Pa., a corporation of Pennsylvania Application June 7, 1932, Serial No. 615,792

4 Claims. (Cl. 29—159.03)

My invention relates to methods of making wheels and particularly to a method of making sheet metal wheels of the artillery type.

One object of my invention is to reduce die drawing strains, permit the use of simple and inexpensive dies, facilitate the various steps of fabrication and assembly, produce a wheel of superior qualifications and obtain other advantages incident to a utilization of the improvement.

In practicing the invention, in one form, a flat plane, sheet metal disc of relatively heavy gauge is pre-formed to shallow cup shape having a substantial mouth-end radial flange normal to the axis of the cup, or to the axis of the single-stamping wheel of which it is ultimately to form a part. This cup is of simple shallow annular shape to prepare the sheet for the somewhat deeper, curved-side conical nave shape, which it is intended to have, in conjunction with spokes of hollow, or rear-opening channel section.

The next step forms the stamping generally to its ultimate contour, with the exception that the spokes are still substantially more shallow than ultimately intended and joined by wheel plane webs and the axial center of the nave remains closed.

Following the above-stated operation, the webs are removed, except for small portions thereof constituting wheel plane flanges at, and conforming to, the sides of the spokes radially inwardly along the side of one spoke, touching the nave, and radially outwardly along the side of the next spoke, and the closed end of the cup or nave portion is opened, as by the removal of a small disc-like portion.

A final operation turns the above-mentioned wheel-plane spoke flanges in the axial direction of the channeled-spoke sides and forms the nave to its ultimate contour.

By leaving the wheel plane flanges on the spokes and subsequently bending them into conformity with, or as extensions of, the channeled spoke sides, the initial channels may be made shallow, thus materially facilitating the die-stamping operation and ensuring the integrity of the sheet texture. Also, this operation provides an exceedingly simple method of providing a deep channel section spoke, without the use of deep dies and without abnormally working the sheet material.

In another form of the invention, where, instead of a single stamping having spokes of channel section, it is desired to have a double-stamping or double-spider wheel having tubular spokes, the sheet material may be of substantially reduced gauge, which permits an advantageous change in the steps above described but not one that is a departure from the method in general.

This change resides in forming radial wheel-plane spider legs or flanges, in an operation corresponding to the operation, first above indicated, in which the disc is cupped and provided with a brim or wheel-plane flange; this latter flange and those of the radial flanges or spider legs of the thinner gauge material both being intended for forming into spokes of channel section.

The second form continues, as the first, by providing wheel plane flanges along the edges of the spokes for ultimate turning, in the axial direction of the spoke sides, to thereby permit the initial die drawing to be shallow compared to the depths of the spokes desired.

Figures 1 to 13, inclusive, of the accompanying drawings, are each a set of views of two or more stamping and/or die parts, indicating diagrammatically a structure and the mode of fabricating it, in accordance with one form of the invention.

Figures 1 and 2 are elevational and plan views, respectively, of the initial work sheet or disc.

Figure 3 is a sectional elevation of the dies and the cup-shaped article.

Figures 4 and 5 are a diametral section and plan respectively, of the product of the first operation, that is, the article resulting from the dies of Figure 3.

Figure 6 shows the dies and article in section for the next operation.

Figures 7 and 8 are sectional elevation and plan views respectively, of the article resulting from this operation.

Figures 9 and 10 are sectional elevation and plan views respectively, showing the next or a simultaneous operation of notching between the spokes and cutting out the central opening.

Figure 11 shows the dies in sectional elevation for forming the complete spoke depth.

Figures 12 and 13 show the sectional elevation and plan, respectively, of the completed wheel body.

Figure 14 is a view, in enlarged axial section, of one half of a wheel including the parts fabricated by the method steps indicated in the previous figures.

Figure 15 is a perspective view of the spider of a modified form of wheel amenable to a slightly modified form of the method steps of the invention, and Figures 16 to 27 inclusive are views similar to Figs. 1 to 13, respectively, indicating the slightly modified method steps for providing the spider of Fig. 15.

Figures 16 and 17 are, respectively, sectional elevations and plan views of the initial blank for the slightly modified article resulting from the variation and the method.

Figures 18 and 19, respectively, show sectional elevations and plan views of the blank after the next operation of forming spoke portions.

Figure 20 shows the dies for the initial axial depth forming operation.

Figures 21 and 22 show in section, elevation and plan, the form of the article resulting from the previous die operation.

Figures 23 and 24 show diametral sectional and plan views, respectively, after a notching or trimming operation performed upon the article of Figures 21 and 22.

Figure 25 shows the dies for forming the complete axial depth of the spokes.

Figures 26 and 27 show, respectively, sectional elevations and plan views of the resulting article from the previous operations, which article is to be half of the resulting wheel body.

Referring to Figs. 1 to 14, inclusive, a member of relatively heavy-gauge sheet-metal, as indicated in Fig. 1, is constructed to disc shape, of approximately the diameter of the stamping for which it is intended. The production of this disc may, or may not, be considered a step of my method, since it may be purchased in this shape and size, or formed in closely related series-sequence relation to the other steps, it being shown here merely to give a clearer idea of the complete operation. Figure 1 is in elevation and Figure 2 shows a plan view.

As indicated in Fig. 3, the above-mentioned disc is placed between dies 2 and 3 and pressed, or preformed, to shallow cup-shape having a cup portion 4 and a wide brim or wheel-plane flange 5. By stamping or forming the disc in this simple manner, the texture of the sheet is prepared for the more intricate bendings to follow.

Figures 4 and 5 show the cup-shaped article resulting from the first die forming operation, which operation has been performed on the dies of Figure 3 upon the blank of Figures 1 and 2.

As indicated in Fig. 6, the cup-shaped element 4—5 of Fig. 3 has been operated upon by dies 6, 7, 8 and 9 to produce the shape 10 as seen in Figures 7 and 8 having spoke portions 12, web portions 14, between the spokes, and a conical nave 15 of curved contour merging into, and about, the radially-inner ends of the spoke portions. These spoke portions, at this stage, are substantially more shallow than ultimately intended, in order to simplify the dies 6 and 7 and to avoid over-stretching the material of the sheet. The next step, as indicated by Figures 9 and 10, is to remove most of the material of the webs 14 between the spokes, but leaving accurately formed wheel-plane flanges 17 on the free, or inner, edges of the channeled spokes 12. The sheet or stamping may also, advantageously be operated upon, simultaneously with the step of Figures 9 and 10, to remove a small disc-like portion providing an aperture 18, at the center of the body as seen in Figure 10.

The final step, indicated in Fig. 11, turns the edges 17 effected during the step of Figures 9 and 10, rearwardly or axially, in the direction of the channeled-spoke edges, to render the spokes of the channel-depth required or desired, over that provided by the dies 6 and 7 of Fig. 6. Preferably, also, this final step may include the simultaneous turning of an edge or perimeter 19 about the opening 18, of Figures 9 and 10, and the final shaping of the stamping to provide an ornamental molding 20, or other features. The resulting article of this operation is readily seen in Figures 12 and 13.

As shown in Fig. 14, the completed wheel comprises the stamping having the spokes 12, the conical nave 15, the inturned edge 19 and the molding 20. The spokes are secured to a rim 22, as by riveting or welding members 23, not germane to this invention, to the rim, and welding them to the spokes. The wheel may be reinforced by an inner member having a conical load portion 24, conforming to the nave 15, a mounting plate portion 25, having conical seats 26, for the reception of mounting studs and nuts, and a member 27 for closing the rear sides of the spokes. An ornamental molding 28, in the form of a metal ring sprung onto the molding 20, and a hub cap 29, secured to the edge 19, as by suitable means 30, complete a wheel of one type for which a stamping, made in accordance with my method, is intended.

As shown in Fig. 15, a spider, made up of similar half-wheel stampings 31 and 32, divided along median wheel-plane surfaces or edges, preferably flash-welded together, and having a modified nave 35 and tubular spokes 34, is, by reason of its double stamping character, permissibly of lighter-gauge sheet-metal, in view of which, as indicated in Figures 16 and 17, it may be initially formed as a ring or washer and then pre-formed, as indicated in Figures 18 and 19, to have an annular radially-inner portion 36 and radially-outer wheel-plane flange portions 37.

An operation, as indicated in Fig. 20 forms the channel spokes, with an excess of material, in the form of wheel-plane flanges 38 as readily seen in Figures 21 and 22, which are subsequently trimmed to accurate dimension, as indicated in Figures 23 and 24, for the final forming operation of Figures 25, 26 and 27.

The latter operation is almost exactly analogous to the final operation of Fig. 11, in that it turns the wheel-plane spoke edge flanges to constitute axial continuations, extensions, enlargements, or merely differently-provided integral parts of the channeled spoke sides.

While I have shown and described particular forms of my invention, changes may be effected therein without departing from the spirit and scope thereof, as set forth in the appended claims.

What I claim is:

1. A method of making an artillery wheel from flat sheet stock which comprises drawing an axially deep nave portion, the while partially drawing the bodies of the spokes extending into said nave portion, trimming the blank between the spokes so as to leave wheel plane marginal flanges along the side walls of the spokes and the peripheral portions between the spokes, and finally pressing upon the marginal flanges to form the full depth of the spoke and nave portions.

2. The method of fabricating a stamped metal artillery wheel spider, the nave and radially projecting spoke portions of which spider are integrally joined together at the nave portion, which comprises utilizing a drawing operation directed axially of the ultimate spider body to draw the nave and spoke portions to a depth less than the ultimate depth of cross section thereof in the completed product leaving metal undrawn to spoke portion cross section projecting flange-like in the plane of the spider from the side walls of the incomplete cross sections of the spoke portions, and thereafter turning such projecting metal across the spider plane to shape said initially partly drawn spokes to final contour.

3. The method of fabricating a stamped metal artillery wheel spider, the nave and radially projecting spoke portions of which spider are integrally joined together at the nave portion, which comprises utilizing a drawing operation directed axially of the ultimate spider body to draw the nave and spoke portions to a depth less than the ultimate depth of cross section thereof in the completed product leaving metal undrawn to spoke portion cross section projecting flange-like in the plane of the spider from the side walls of the incomplete cross sections of the spoke portions, and thereafter turning such projecting metal across the spider plane to complete the cross section of the spoke portions, said turning operation characterized principally by bending rather than drawing the metal.

4. The method of fabricating a stamped metal artillery wheel spider, the nave and radially projecting spoke portions of which spider are integrally joined together at the nave portion, which comprises utilizing a drawing operation directed axially of the ultimate spider body to draw the nave and spoke portions to a depth less than the ultimate depth of cross section thereof in the completed product leaving metal undrawn to spoke portion cross section projecting flange-like in the plane of the spider from the side walls of the incomplete cross sections of the spoke portions, and thereafter turning such projecting metal across the spider plane to complete the cross section of the spoke portions, said flange-like projecting metal being of a width greater than the thickness of the metal and being a substantial part of the complete depth of cross section of said spokes.

FRANKLIN R. HIGHT.